United States Patent
Fu et al.

(10) Patent No.: US 12,250,688 B2
(45) Date of Patent: Mar. 11, 2025

(54) RESOURCE TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 393 days.

(21) Appl. No.: 17/730,636

(22) Filed: Apr. 27, 2022

(65) Prior Publication Data
US 2022/0256580 A1 Aug. 11, 2022

Related U.S. Application Data

(63) Continuation of application No. PCT/CN2020/091668, filed on May 21, 2020.

(51) Int. Cl.
*H04W 72/21* (2023.01)
*H04L 1/1812* (2023.01)
*H04W 72/566* (2023.01)

(52) U.S. Cl.
CPC ........... *H04W 72/21* (2023.01); *H04L 1/1812* (2013.01); *H04W 72/569* (2023.01)

(58) Field of Classification Search
CPC . H04W 72/21; H04W 72/569; H04W 72/115; H04W 72/02; H04W 72/231; H04L 1/1812; H04L 1/1822; H04L 1/1887
See application file for complete search history.

(56) References Cited

U.S. PATENT DOCUMENTS

| 2017/0367036 A1 | 12/2017 | Chen et al. | |
| 2019/0174466 A1 | 6/2019 | Zhang et al. | |
| 2020/0221490 A1* | 7/2020 | Baek | H04W 72/569 |
| 2020/0228248 A1* | 7/2020 | Islam | H04L 5/0055 |
| 2020/0322980 A1* | 10/2020 | Fakoorian | H04W 76/11 |
| 2021/0105096 A1* | 4/2021 | Chin | H04L 1/1812 |

(Continued)

FOREIGN PATENT DOCUMENTS

| CN | 106134263 A | 11/2016 |
| CN | 109587770 A | 4/2019 |

(Continued)

OTHER PUBLICATIONS

Third Office Action for Chinese Application No. 2022108075481 Issued Nov. 10, 2023, 10 Pages with English Translation.

(Continued)

*Primary Examiner* — Liem H. Nguyen
(74) *Attorney, Agent, or Firm* — PERKINS COIE LLP

(57) ABSTRACT

The present disclosure relates to a resource transmission method and a terminal device. The resource transmission method includes: in the event of a resource conflict, a terminal device transmits an uplink resource according to a fulfilled condition. According to implementations of the present disclosure, the probability that resources configured for the same terminal device conflict in time may be reduced, and the resource conflicts of the same terminal device may be reduced by setting a transmission condition for in the event of resource conflict.

5 Claims, 3 Drawing Sheets

200

A terminal device transmits an uplink resource according to a satisfied condition in a case of resource overlapping — S210

(56) References Cited

U.S. PATENT DOCUMENTS

| | | | |
|---|---|---|---|
| 2021/0219300 A1* | 7/2021 | Lou | H04L 5/0044 |
| 2021/0307027 A1* | 9/2021 | Kung | H04W 72/569 |
| 2021/0315018 A1* | 10/2021 | Baek | H04W 74/0833 |
| 2022/0022211 A1* | 1/2022 | Fan | H04L 1/1893 |
| 2022/0264595 A1* | 8/2022 | Xiao | H04W 72/569 |
| 2022/0353899 A1* | 11/2022 | Xiao | H04L 1/188 |
| 2023/0024055 A1* | 1/2023 | Lu | H04W 72/1268 |
| 2023/0058734 A1* | 2/2023 | Xiao | H04L 1/1812 |
| 2023/0189323 A1* | 6/2023 | Baek | H04W 72/563 370/329 |
| 2023/0209589 A1* | 6/2023 | Baek | H04W 72/569 370/329 |

FOREIGN PATENT DOCUMENTS

| | | |
|---|---|---|
| GB | 201812914 | 9/2018 |
| JP | 5864691 B1 | 2/2016 |
| WO | 2019136713 A1 | 7/2019 |
| WO | 2020033711 A1 | 2/2020 |
| WO | 2020165281 A1 | 8/2020 |

OTHER PUBLICATIONS

Notice of Allowance for Chinese Application No. 2022108075481 Issued Jan. 13, 2024, 5 Pages with English Translation.

CATT , "Leftover issues for CGCG and CGDG prioritization", R2-1905748 3GPP TSG-RAN WG2 Meeting #106 , Reno, USA, May 13-May 17, 2019, 4 Pages.

ZTE , Sanechips, "Consideration on the Data in the HARQ Buffer Associated with Dropped Grant" , R2-1906123,3GPP TSG-RAN WG2 Meeting #106, Reno, USA, May 13-May 17, 2019, 3 Pages.

CATT "Intra-UE prioritization framework considering RAN1/RAN2" R2-1914411; 3GPP TSG-RAN WG2 Meeting #108; Reno, USA; Nov. 18-22, 2019. 5 pages.

Extended European Search Report for European Application No. 20936607.9 issued Aug. 8, 2022. 12 pages.

Vivo "Draft Reply LS on Intra-UE Prioritization" R1-2003348; 3GPP TSG RAN WG1 Meeting #101; e-Meeting; May 25-Jun. 4, 2020. 2 pages.

International Search Report Mailed Feb. 22, 2021 in Application No. PCT/CN2020/091668.

3GPP TS 38.321 V16.5.0 (Jun. 2021), 3rd Generation Partnership Project; Technical Specification Group Radio Access Network; NR; Medium Access Control (MAC) protocol specification, 156 pages.

CATT, Remaining issues for intra-UE multiplexing and prioritization, 3GPP TSG-RAN WG2, Meeting #109, R2-2000115, Elbonia, Feb. 24-Mar. 6, 2020, 5 pages.

Samsung, Summary of Data-Data Prioritization and SR-Data Prioritization, 3GPP TSG-RAN2 Meeting #109-e, R2-2002083, Feb. 24-Mar. 6, 2020 (Revision of R2-2001488), 11 pages.

Examination Report for European Application No. 20936607.9 Issued Jul. 26, 2023, 5 Pages.

First Office Action for Chinese Application No. 202210807548.1 Issued Jul. 14, 2023, 17 Pages with English Translation.

Second Office Action for Chinese Application No. 202210807548.1 Issued Sep. 8, 2023, 14 Pages with English Translation.

Examination Report for European Application No. 20936607.9 issued Feb. 20, 2023. 7 pages.

* cited by examiner

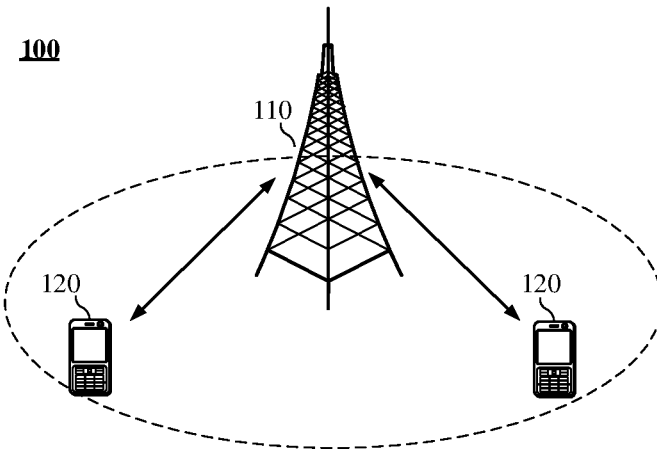
FIG. 1
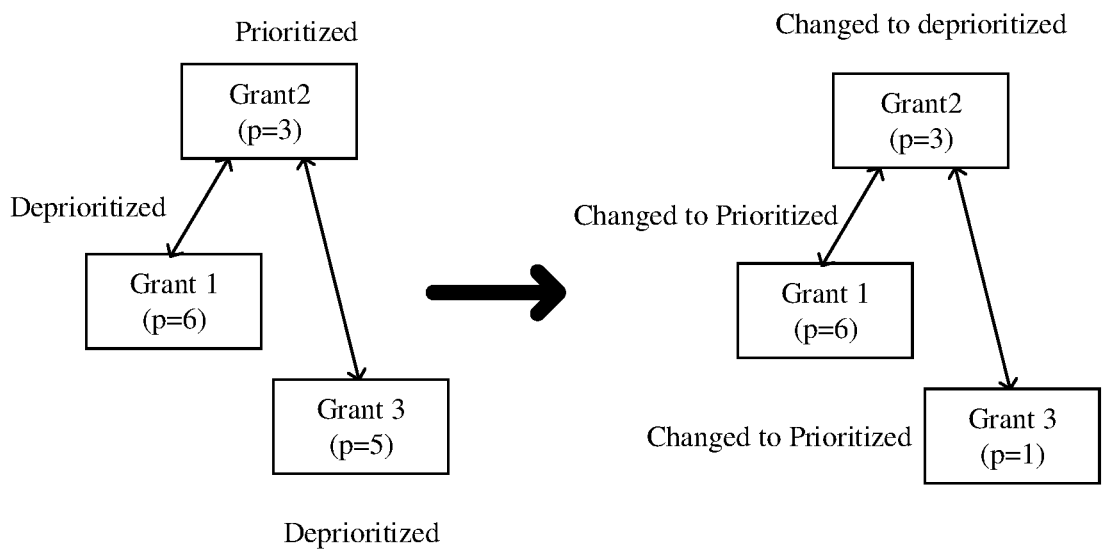
FIG. 2
FIG. 3

RESOURCE TRANSMISSION METHOD AND TERMINAL DEVICE

CROSS-REFERENCE TO RELATED APPLICATION

The present application is a continuation application of International PCT Application No. PCT/CN2020/091668, filed on May 21, 2020, the entire content of which is hereby incorporated by reference.

TECHNICAL FIELD

The present disclosure relates to the field of communication, and more particularly, to a resource transmission method and a terminal device.

BACKGROUND

Transmission of services such as Factory automation, Transport Industry and Electrical Power Distribution in 5G systems needs to be supported in the 5th-Generation (5G) Industrial Interest of Things (IIoT). Based on transmission requirements for delay and reliability of services, Time Sensitive Network (TSN) or Time Sensitive Communication (TSC) is introduced in the IIoT. Therefore, how to reduce overlap of resources configured for a user is a problem that needs to be solved.

SUMMARY

Implementations of the present disclosure provide a resource transmission method and a terminal device, so as to reduce overlap of resources configured for a same terminal device.

An implementation of the present disclosure provides a resource transmission method including: transmitting, by a terminal device, an uplink resource according to a satisfied condition in a case of resource overlapping.

An implementation of the present disclosure provides a terminal device including: a processing unit configured to transmit an uplink resource according to a satisfied condition in a case of resource overlapping.

An implementation of the present disclosure provides a terminal device including a processor and a memory. The memory is configured to store a computer program, and the processor is configured to invoke and run the computer program stored in the memory, to enable the terminal device to perform the resource transmission method described above.

An implementation of the present disclosure provides a network device including a processor and a memory. The memory is configured to store a computer program, and the processor is configured to invoke and run the computer program stored in the memory, to enable the network device to perform the resource transmission method described above.

An implementation of the present disclosure provides a chip configured to implement the resource transmission method described above.

Specifically, the chip includes a processor configured to invoke and run a computer program from a memory, to enable a device having the chip installed thereon to perform the resource transmission method described above.

An implementation of the present disclosure provides a computer-readable storage medium for storing a computer program, wherein when the computer program is run by a device, the device is enabled to perform the resource transmission method described above.

An implementation of the present disclosure provides a computer program product including computer program instructions, which enable a computer to perform the resource transmission method described above.

An implementation of the present disclosure provides a computer program, wherein when running on a computer, the computer program enables the computer to perform the resource transmission method described above.

In the implementations of the present disclosure, a probability of overlap of resources configured for a same terminal device in time may be decreased by setting a transmission condition in a case of resource overlapping, thereby reducing overlap of the resources of the same terminal device.

BRIEF DESCRIPTION OF DRAWINGS

FIG. 1 is a schematic diagram of an application scenario according to an implementation of the present disclosure.

FIG. 2 is a schematic flowchart of a resource transmission method according to an implementation of the present disclosure.

FIG. 3 is an example diagram of priority change of a resource transmission method according to an implementation of the present disclosure.

DETAILED DESCRIPTION

Figure 4:
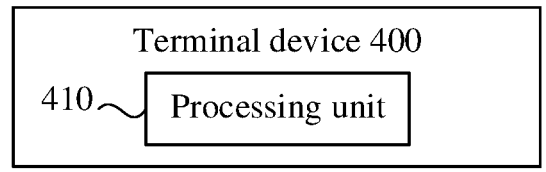
FIG. 4 is a schematic block diagram of a terminal device according to an implementation of the present disclosure.

Technical solutions in the implementations of the present disclosure will be described below in combination with the drawings in the implementations of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation (5th-Generation) communication system, or other communication systems.

Generally speaking, a quantity of connections supported by a traditional communication system is limited, and connections are easy to implement. However, with development of communication technologies, a mobile communication system will support not only traditional communication, but also, for example, Device to Device (D2D) communication, Machine to Machine (M2M) communication, Machine Type Communication (MTC), and Vehicle to Vehicle (V2V) communication. The implementations of the present disclosure may also be applied to these communication systems.

Optionally, a communication system in an implementation of the present disclosure may be applied to a Carrier Aggregation (CA) scenario, or a Dual Connectivity (DC) scenario, or a Standalone (SA) network deployment scenario.

A spectrum to which an implementation of the present disclosure is applied is not limited. For example, the implementations of the present disclosure may be applied to both a licensed spectrum and an unlicensed spectrum.

Various implementations of the present disclosure are described in combination with a network device and a terminal device, wherein the terminal device may also be referred to as User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal device may be a STATION (ST) in a WLAN, or may a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, or a next generation communication system, such as, a terminal device in an NR network, or a terminal device in a future evolved Public Land Mobile Network (PLMN).

By way of an example but not a limitation, in the implementations of the present disclosure, the terminal device may also be a wearable device. The wearable device may also be referred to as a wearable smart device, which is a general term of wearable devices, such as glasses, gloves, watches, clothes, and shoes, designed intelligently and developed for daily wear by applying wearable technologies. The wearable device is a portable device that is worn directly on a body or integrated into clothes or an accessory of a user. The wearable device is not only a type of hardware device, but also implement powerful functions through software support as well as data interaction or cloud interaction. A generalized wearable smart device includes a device such as a smart watch or a pair of smart glasses which is fully functional, has large sizes, and may implement complete or partial functions without relying on a smart phone, and a device such as various smart bracelets and smart jewelries for monitoring physical signs, which focuses on a type of application function only and needs to be used in conjunction with another device such as a smart phone.

The network device may be a device for communicating with a mobile device, or may be an Access Point (AP) in a WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device (gNB) in an NR network, or a network device in a future evolved PLMN network.

In the implementations of the present disclosure, the network device provides services for a cell, and the terminal device communicates with the network device through transmission resources (e.g., frequency domain resources or spectrum resources) used by the cell. The cell may be a cell corresponding to the network device (e.g., a base station). The cell may be a macro base station, or a base station corresponding to a Small cell. The Small cell here may include: a Metro cell, a Micro cell, a Pico cell, or a Femto cell, etc. These Small cells have characteristics of small coverage and low transmit power, and are suitable for providing high-speed data transmission services.

FIG. 1 illustrates exemplarily a communication system 100. The communication system includes one network device 110 and two terminal devices 120. Optionally, the communication system 100 may include multiple network devices 110, and other numbers of terminal devices 120 may be included within coverage of each network device 110, which is not limited in the implementations of the present disclosure.

Optionally, the communication system 100 may further include another network entity, such as a Mobile Management Entity (MME) and an Access and Mobility Management Function (AMF), which is not limited in the implementations of the present disclosure.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is an "or" relationship between associated objects before and after "/".

FIG. 2 is a schematic flowchart of a resource transmission method 200 according to an implementation of the present disclosure. The method may optionally be applied to the system shown in FIG. 1, but is not limited thereto. The method includes at least part of following contents.

In S210, a terminal device transmits an uplink resource according to a satisfied condition in a case of resource overlapping.

Optionally, in the implementation of the present disclosure, the case of resource overlapping includes at least one of following: multiple Physical Uplink Shared Channels (PUSCHs) overlap; a PUSCH overlaps with a Physical Uplink Control Channel (PUCCH); a Dynamic Grant (DG) overlaps with at least one Configured Grant (CG); multiple DGs overlap; and multiple CGs overlap.

Optionally, in the implementation of the present disclosure, the PUCCH is a PUCCH used for transmitting a Scheduling Request (SR).

Optionally, in the implementation of the present disclosure, the uplink resource includes a Medium Access Control (MAC) Protocol Data Unit (PDU) and/or an SR.

The SR sometimes may also be referred to as an SR transmission or an SR transmission occasion.

Optionally, in the implementation of the present disclosure, the SR transmission is an available SR transmission resource, and the SR transmission does not include an SR resource of a deprioritized SR. In addition, optionally, the SR transmission occasion is an available SR transmission resource, and the SR transmission occasion includes an SR resource of a deprioritized SR.

Optionally, in the implementation of the present disclosure, in another implementation mode, the SR transmission is an available SR transmission resource, and the SR transmission may also include an SR resource of a deprioritized SR. In addition, optionally, the SR transmission occasion is an available SR transmission resource, and the SR transmission occasion includes an SR resource of a deprioritized SR.

Optionally, in the implementation of the present disclosure, transmitting the uplink resource according to the satisfied condition includes: transmitting one uplink resource if a first condition is satisfied. For example, one MAC PDU or one SR transmission is transmitted. A resource, a resource that is considered to have a low priority or is not transmitted, is a deprioritized resource.

Optionally, in the implementation of the present disclosure, transmitting one uplink resource includes: generating one uplink resource by MAC of the terminal device, transmitting one uplink resource to a Hybrid Automatic Repeat reQuest (HARQ) process, instructing an HARQ process to transmit one uplink resource, sending one uplink resource to a Physical Layer (PHY), or instructing a PHY to transmit one uplink resource.

Optionally, in the implementation of the present disclosure, the generating one uplink resource by the MAC of the terminal device, transmitting one uplink resource to the HARQ process, instructing the HARQ process to transmit one uplink resource, sending one uplink resource to the PHY, or instructing the PHY to transmit one uplink resource includes: packaging one resource by the MAC of the terminal device to obtain one uplink resource in a case that no uplink resource is generated, transmitting an uplink resource obtained by packaging the one resource to the HARQ process, instructing the HARQ process to transmit an uplink resource obtained by packaging the one resource, sending an uplink resource obtained by packaging the one resource to the PHY, or instructing the PHY to transmit an uplink resource obtained by packaging the one resource.

Optionally, in the implementation of the present disclosure, the method further includes: not generating another uplink resource by the MAC of the terminal device in a case that an uplink resource has been generated.

Optionally, in the implementation of the present disclosure, the method further includes: in a case that an uplink resource has been generated, if packaging is not performed and what is transmitted preferentially is not the generated uplink resource, generating another uplink resource by the MAC of the terminal device.

Optionally, in the implementation of the present disclosure, the first condition includes at least one of following: the terminal device does not have or does not report a PHY priority processing capability; PHY priorities of overlapping resources of the terminal device are the same; the terminal device receives first indication information from a PHY; the terminal device receives first indication information from a network; a PHY of the terminal device does not support cancellation or PHY cancellation is not configured; the terminal device does not configure a PHY overlapping resource priority processing mode; the terminal device does not configure a first parameter (such as a PHY priority index (PHY-PriorityIndex)); a first parameter is not configured for at least one overlapping resource; values of a first parameter configured for at least one overlapping resource are the same; the terminal device does not support receiving or processing more than one resource; the terminal device does not support receiving or processing more than one resource based on a PHY overlapping resource priority processing mode; the terminal device has or reports a MAC priority processing capability; and the terminal device configures a MAC priority processing mode or a MAC priority processing mode is configured for at least one resource.

Optionally, in the implementation of the present disclosure, the first indication information indicates that the terminal device can only process one uplink resource, overlapping resources have been transmitted, overlapping resources cannot be cancelled, a time requirement for PHY cancellation is not met, a processing requirement for cancellation is not met, a PHY does not support a PHY priority processing capability or a PHY does not configure a PHY priority processing mode.

Optionally, in the implementation of the present disclosure, a case that the terminal device does not configure the PHY overlapping resource priority processing mode includes at least one of following cases.

The terminal device does not configure an overlapping resource PHY priority index for at least one overlapping resource. For example, the terminal device does not configure an overlapping resource PHY priority index for one, more, or all overlapping resources.

Overlapping resource PHY priority indexes configured by the terminal device for at least one overlapping resource are the same. For example, the terminal device configures an overlapping resource PHY priority index for one, more, or all overlapping resources and a value of the index is the same.

A Radio Resource Control (RRC) message received by the terminal device indicates that an overlapping resource PHY priority index is not or cannot be carried in Downlink Control Information (DCI).

An RRC message received by the terminal device does not indicate that an overlapping resource PHY priority index may be carried in DCI.

Optionally, in the implementation of the present disclosure, a case that the terminal device does not configure a MAC priority processing mode is that Logical Channel (LCH)-based prioritization (lch-basedPrioritization) is not configured.

Optionally, in the implementation of the present disclosure, the first parameter is a PHY-PriorityIndex or a specific configuration parameter for a MAC entity/UE.

Optionally, in the implementation of the present disclosure, if the first condition is satisfied, a manner in which one uplink resource is transmitted based on a case of resource overlapping includes at least one of following manners.

In a case that a DG overlaps with a CG, a MAC PDU of the DG is generated, or the CG is deprioritized. Accordingly, a DG resource is considered to be a prioritized or transmitted resource.

In a case that a PUSCH overlaps with an SR, the SR is not indicated to a PHY for transmission or the SR is deprioritized. Accordingly, the PUSCH is considered to be a prioritized or transmitted resource.

In a case that multiple CGs overlap or multiple DGs overlap, other resources are deprioritized except resources that are transmitted or considered to be prioritized.

In a case that a CG overlaps with a DG, other resources are deprioritized except resources that are transmitted or considered to be prioritized.

Deprioritized may also be considered to have a low priority.

Illustratively, when a MAC entity is configured with Logical Channel (LCH)-based prioritization (lch-basedPrioritization) and there is an overlapping PUSCH duration of at least two Configured Grants (uplink grants), priorities of the at least two Configured Grants indicated by PHY-PriorityIndexes are equal or PHY-PriorityIndexes of the at least two Configured Grants are not configured, an overlapped MAC PDU(s) is not generated if one MAC PDU has already been generated.

As another example, when a MAC entity is configured with lch-basedPrioritization and there is an overlapping PUSCH duration of one Dynamic Grant (DG) and at least one Configured Grant (CG), priorities of the DG and/or the at least one CG indicated by PHY-PriorityIndexes are equal or PHY-PriorityIndexes of the DG and/or the at least one CG are not configured, a MAC PDU associated with the Dynamic Grant is generated As a further example, when a MAC entity is configured with lch-basedPrioritization and there is overlapping PUCCH resource for an SR transmission and any Uplink Shared Channel (UL-SCH)/PUSCH resource(s), priorities of the overlapping resources (the PUCCH resource and/or any Uplink Shared Channel (UL-SCH)/PUSCH resource(s)) indicated by PHY-PriorityIndexes are equal or PHY-PriorityIndexes of the overlapping resources are not configured, an SR is not indicated to a Physical Layer to send or a PHY is not supported to send an SR.

Optionally, in the implementation of the present disclosure, transmitting the uplink resource according to the satisfied condition includes: transmitting at least one uplink resource if a second condition is satisfied. If the second condition is satisfied, the terminal device may transmit one, more, or all uplink resources. For example, at least one MAC PDU and/or at least one SR transmission is transmitted. Specifically, any one of following examples is included: multiple MAC PDUs are transmitted; multiple SR transmissions are transmitted; one MAC PDU and one SR transmission are transmitted; one MAC PDU and multiple SR transmissions are transmitted; multiple MAC PDUs and one SR transmission are transmitted. Illustratively, if the second condition is satisfied, each uplink resource is transmitted or a MAC transmits each uplink resource.

Optionally, in the implementation of the present disclosure, transmitting at least one uplink resource includes at least one of following cases.

A MAC of the terminal device packages at least one resource to obtain a corresponding uplink resource. For example, a MAC packages each resource to obtain an uplink resource corresponding to each resource. As another example, a MAC packages a part of a resource to obtain an uplink resource corresponding to the part of the resource.

A MAC of the terminal device indicates an uplink resource obtained by packaging at least one resource to a PHY. For example, a MAC indicates an uplink resource obtained by packaging each resource to a PHY. As another example, a MAC indicates an uplink resource obtained by packaging a part of a resource to a PHY.

A MAC of the terminal device indicates at least one transmission of an uplink resource to an HARQ process. For example, for each uplink resource, a MAC indicates transmission of the uplink resource to an HARQ process. As another example, for a part of an uplink resource, a MAC indicates transmission of the uplink resource to an HARQ process.

A MAC of the terminal device indicates at least one transmission of an uplink resource to a PHY. For example, a MAC indicates each transmission of an uplink resource to a PHY. As another example, a MAC indicates transmission of a part of an uplink resource to a PHY. The uplink resource may be a MAC PDU or an SR.

Optionally, in the implementation of the present disclosure, transmitting at least one uplink resource further includes at least one of following: in a case that an uplink resource has been generated, if a resource priority corresponding to the generated uplink resource is low or the generated uplink resource is not a resource transmitted preferentially or is not a resource of a predetermined type or is not a predetermined resource, generating a corresponding uplink resource by a MAC of the terminal device for a resource with a high priority or a predetermined resource, or indicating transmission of an uplink resource with a high priority or a predetermined uplink resource by a MAC of the terminal device.

Optionally, in the implementation of the present disclosure, transmitting at least one uplink resource further includes at least one of following: if a DG overlaps with a CG, generating only a resource corresponding to the DG or transmitting only for the DG. (e.g., the terminal device does not have or does not report a MAC priority processing capability or does not configure a MAC priority processing mode).

Optionally, in the implementation of the present disclosure, the method further includes: if a PHY receives only one uplink resource, transmitting the uplink resource by the PHY.

Optionally, in the implementation of the present disclosure, the method further includes: if a PHY receives multiple uplink resources, selecting one of the uplink resources by the PHY for transmission.

Optionally, in the implementation of the present disclosure, a manner in which the PHY selects one uplink resource from received uplink resources includes at least one of following: depending on implementation of the PHY; the PHY selecting a PUSCH, a starting position of which is in the front, for transmission; the PHY selecting an uplink resource, an end position of which is in the front, for transmission; the PHY selecting an uplink resource, an end position of which is at the back, for transmission; the PHY selecting a PUSCH that arrives first for transmission; the PHY selecting a MAC PDU that arrives first for transmission; the PHY selecting a PUCCH for transmission; the PHY selecting a PUSCH for transmission; the PHY selecting a PUSCH with a high priority for transmission; the PHY selecting a PUSCH, a starting position of which is at the back, for transmission; the PHY selecting a PUSCH that arrives later for transmission; the PHY selecting a MAC PDU that arrives later for transmission; the PHY selecting a resource, a starting position of which is in the front, for transmission; the PHY selecting a resource that arrives first for transmission; the PHY selecting a resource, a starting position of which is at the back, for transmission; and the PHY selecting a resource that arrives later for transmission.

For example, when a cancellation condition (the first condition) is not satisfied, the PHY selects the PUSCH, the starting position of which is in the front, for transmission, or the PHY selects the PUSCH that arrives first for transmission.

For example, when the cancellation condition is satisfied, the PHY selects the PUSCH, the starting position of which is at the back, for transmission, or the PHY selects the PUSCH that arrives later for transmission.

For example, when the cancellation condition (the first condition) is not satisfied, the PHY selects the uplink resource, the starting position of which is in the front, for transmission, or the PHY selects the uplink resource that arrives first for transmission, or the PHY selects the uplink resource, the end position of which is in the front, for transmission. This uplink resource may be a PUCCH or a PUSCH.

For example, when the cancellation condition is satisfied, the PHY selects the uplink resource, the starting position of which is at the back, for transmission, or the PHY selects the uplink resource that arrives later for transmission, or the PHY selects the uplink resource, the end position of which is at the back, for transmission. This uplink resource may be a PUCCH or a PUSCH.

Optionally, in the implementation of the present disclosure, the second condition includes at least one of following: the terminal device does not have or does not report a MAC priority processing capability; the terminal device does not configure a MAC priority processing mode (for example, LCH-based prioritization is not configured); the terminal device has or reports both MAC and PHY priority processing capabilities; the terminal device receives second indication information from a PHY; the terminal device receives second indication information from a network; the terminal device configures only a PHY overlapping resource priority processing mode; the terminal device configures a first parameter (such as a PHY priority index (PHY-PriorityIndex)); a first parameter is configured for at least one overlapping resource; values of a first parameter configured for at least one overlapping resource are different; the terminal device configures both a MAC priority processing mode and a first parameter; the terminal device configures a PHY overlapping resource priority processing mode for at least one uplink resource; the terminal device configures only PHY cancellation; the terminal device configures both MAC and PHY overlapping resource priority processing modes; the terminal device configures both a MAC overlapping resource priority processing mode and PHY cancellation; a PHY of the terminal device supports cancellation or the terminal device configures PHY cancellation; the terminal device supports receiving/processing more than one resource; and the terminal device supports receiving or processing more than one resource based on a PHY overlapping resource priority processing mode.

Optionally, in the implementation of the present disclosure, the second indication information indicates that at least one uplink resource can be processed, an overlapping resource is not transmitted or an overlapping resource may be cancelled, a time requirement for PHY cancellation is met, a processing requirement for cancellation is not met, a PHY supports a PHY priority processing capability or a PHY configures a PHY priority processing mode.

Optionally, in the implementation of the present disclosure, a case that the terminal device configures the PHY overlapping resource priority processing mode includes at least one of following: the terminal device configures an overlapping resource PHY priority index; overlapping resource PHY priority indexes configured by the terminal device are different; and an RRC message received by the terminal device indicates that an overlapping resource PHY priority index (PHY-PriorityIndex) is or may be carried in DCI.

Optionally, in the implementation of the present disclosure, the method further includes: in a case of resource overlapping, a resource, which is considered to have a low priority or is not transmitted, is configured to be deprioritized.

Optionally, in the implementation of the present disclosure, the method further includes: if a priority of a first uplink resource changes to be higher or a priority of a first uplink resource changes to be higher than a priority of another uplink resource which overlaps with the first uplink resource, a MAC priority processing mode can be performed for the first uplink resource, the priority of the first uplink resource can be compared with the priority of the another uplink resource, the first uplink resource can be re-considered to be deprioritized or prioritized, or a determination whether the first uplink resource is deprioritized or prioritized can be re-executed. That the determination whether the first uplink resource is deprioritized or prioritized can be re-executed may also be considered to be that a comparison of whether the first uplink resource is deprioritized or prioritized can be re-executed. (Allow prioritization when the priority of an uplink grant changes to be higher than the priority of other overlapped uplink resource.) Illustratively, another overlapping uplink resource may be an SR or a PUSCH. Illustratively, another overlapping uplink resource may be at least one uplink resource or all uplink resources or all PUSCH resources.

Optionally, in the implementation of the present disclosure, the method further includes: if a second uplink resource is considered to be deprioritized because it overlaps with another uplink resource, and the another uplink resource is considered or re-considered to be deprioritized, then a MAC priority processing mode can be performed for the second uplink resource, a priority of the second uplink resource can be compared with a priority of another uplink resource, the second uplink resource can be re-considered to be deprioritized or prioritized, or a determination whether the second uplink resource is deprioritized or prioritized can be re-executed. That the determination whether the second uplink resource is deprioritized or prioritized can be re-executed may also be considered to be that a comparison of whether the second uplink resource is deprioritized or prioritized can be re-executed. (Allow prioritization for the uplink grant which is originally deprioritized by another grant and the another grant is changed to deprioritized.) Illustratively, another overlapping uplink resource may be an SR or a PUSCH. Illustratively, another overlapping uplink resource may be at least one uplink resource or all uplink resources or all PUSCH resources.

Optionally, in the implementation of the present disclosure, the first uplink resource or the second uplink resource is considered or can be considered to be a resource with a high priority.

For example, as shown in FIG. 3, if a resource is deprioritized by another uplink grant that has not been deprioritized, and the uplink grant is changed to be deprioritized, the resource is changed to be prioritized again. Some examples are given below.

At time t1, resources Grant1 and Grant3 are deprioritized by Grant2. Assuming that Grant1 overlaps with Grant2, Grant3 overlaps with Grant2, and a priority of Grant2 is higher.

At time t2, a priority of Grant3 is higher than that of Grant2. Grant3 is determined to be prioritized, and Grant2 is changed to be deprioritized. Therefore, a priority of Grant1 may be re-identified or be changed, or Grant1 may be considered to be a prioritized resource or be considered to be prioritized.

In a protocol, following modifications may be made.

When a MAC entity is configured with LCH-based prioritization, for an uplink grant which has not yet been deprioritized or a priority of the uplink grant has been changed to be higher than a priority of another overlapping uplink resource, the MAC entity shall perform following acts.

In S1, if the uplink grant is sent to a CS-RNTI in a form of New Data Indicator (NDI)=1 or a Cell Radio Network Temporary Identifier (C-RNTI), then S2 is performed, otherwise S5 is performed.

In S2, it is determined whether following conditions are satisfied: if there is no overlapping PUSCH duration of a Configured Grant which is in a same Bandwidth part (BWP) as the uplink grant, and a priority of the Configured Grant is higher than the priority of the uplink grant; and if there is no overlapping PUCCH resource with an SR transmission, wherein a priority of a logical channel that triggers the SR is higher than the priority of the uplink grant.

When the above conditions of S2 are satisfied, S3 to S4 may be performed.

In S3, the uplink grant is considered to be a prioritized uplink grant. If there is an overlapping uplink grant, the overlapping uplink grant is an uplink grant with a low priority.

In S4, another overlapping uplink grant (if any) is considered to be a prioritized uplink grant, which is originally considered to be a resource with a low priority because it overlaps with another uplink grant and the another uplink grant is changed to be a resource with a low priority.

In S5, if the uplink grant is a configured uplink grant (Configured Grant):

In S6, it is determined whether the uplink grant satisfies following conditions: there is no overlapping PUSCH duration of another Configured Grant which is in a same BWP as the uplink grant, and a priority of the another Configured Grant is higher than the priority of the uplink grant; and there is no overlapping PUCCH duration of a grant of a CS-RNTI scrambled and NDI=1, or of a C-RNTI scrambled, which is in a same BWP as the uplink grant, and a priority of the grant is higher than or equal to the priority of the uplink grant; and there is no overlapping PUCCH resource with an SR transmission, wherein a priority of a logical channel that triggers the SR is higher than the priority of the uplink grant.

When the above conditions of S6 are satisfied, S7 to S8 may be performed.

In S7, the uplink grant is considered to be a prioritized uplink grant. If there is an overlapping uplink grant, the overlapping uplink grant is an uplink grant with a low priority.

In S8, another overlapping uplink grant (if any) is considered to be a prioritized uplink grant, which is originally considered to be a resource with a low priority because it overlaps with another uplink grant and the another uplink grant is changed to be a resource with a low priority.

(1> if this uplink grant is addressed to CS-RNTI with NDI=1 or C-RNTI:
2> if there is no overlapping PUSCH duration of a configured uplink grant which was not already de-prioritized, in the same BWP whose priority is higher than the priority of the uplink grant; and
2> if there is no overlapping PUCCH resource with an SR transmission where the priority of the logical channel that triggered the SR is higher than the priority of the uplink grant:
3> consider this uplink grant as a prioritized uplink grant;
3> consider the other overlapping uplink grant(s), if any, as a de-prioritized uplink grant(s).
4> consider the other overlapping uplink grant(s), if any, as a prioritized uplink grant(s), who is originally deprioritized by another grant and the another grant is changed to deprioritized.
1> else if this uplink grant is a configured uplink grant:
2> if there is no overlapping PUSCH duration of another configured uplink grant which was not already de-prioritized, in the same BWP, whose priority is higher than the priority of the uplink grant; and
2> if there is no overlapping PUSCH duration of an uplink grant addressed to CS-RNTI with NDI=1 or C-RNTI which was not already de-prioritized, in the same BWP, whose priority is higher than or equal to the priority of the uplink grant; and 2> if there is no overlapping PUCCH resource with an SR transmission where the priority of the logical channel that triggered the SR is higher than the priority of the uplink grant:
3> consider this uplink grant as a prioritized uplink grant;
3> consider the other overlapping uplink grant(s), if any, as a de-prioritized uplink grant(s).
4> consider the other overlapping uplink grant(s), if any, as a prioritized uplink grant(s), who is originally deprioritized by another grant and the another grant is changed to deprioritized.)

In an application scenario, overlap of resources configured for a same user in time includes overlap between a data channel and a data channel, overlap between a data channel and a control channel (or Uplink Control Information (UCI)), overlap between a control channel (or UCI) and a control channel (or UCI), etc. The UCI may include at least one of an SR, an HARQ feedback, and a Channel State information-Resource Indicator (CSI-RS).

In a resource overlapping scenario, there is a situation where multiple resources overlap. In a case of resource overlapping, sometimes a MAC may generate two MAC PDUs; sometimes the MAC generates one MAC PDU. When the MAC generates two MAC PDUs, a PHY may not be able to process them. Therefore, it may cause problems that the PHY does not know how to transmit and the MAC does not know how to package. Similarly, in a case of resource overlapping, a MAC sometimes may send a MAC PDU and an SR to a PHY; the MAC sometimes only sends a MAC PDU or an SR. When the MAC may send the MAC PDU and the SR to the PHY, the PHY may not be able to process them. Therefore, when the MAC may send multiple MAC PDUs or send an SR and a MAC PDU to the PHY needs to be determined. When the MAC can only send one MAC PDU or one SR to the PHY needs to be determined.

In the implementation of the present disclosure, a condition for a MAC to package or a condition for sending a MAC PDU and/or an SR to a PHY may be determined explicitly, so as to avoid a problem that the MAC packages multiple but the PHY only handles one, or avoid a problem that both the MAC PDU and the SR are sent to the PHY but the PHY cannot process them, or avoid a problem that the PHY and the MAC understand or process differently, or avoid a problem that the PHY is unsure how to process in a case that it receives multiple resources and cannot transmit. At the same time, consistency of understanding of a network and a UE for overlap processing can also be ensured.

Example one: when the first condition is satisfied, a UE MAC only generates one MAC PDU or one SR for transmission. Take generating one MAC PDU as an example, specific acts are as follows.

1. A network schedules or configures resources of a UE for transmission.

2. If there is overlap between resources of the UE scheduled or configured by the network, the UE can only send one resource to a network side. However, the UE may package at least one of the resources, or send a packaged resource to a PHY (or instruct the PHY to transmit). When the first condition is satisfied, in a case of resource overlapping, a UE MAC only generates one MAC PDU, or only indicates the MAC PDU to the PHY, or only indicates an SR for transmission, or indicates one transmission to the PHY.

The first condition described above may include at least one of following conditions: the UE does not have or does not report a PHY priority processing capability (Release 16 (R16) priority processing capability); PHY priorities of overlapping resources are the same; (e.g., none of the overlapping resources is configured with a PHY-PriorityIndex, or all of the overlapping resources are configured with PHY-PriorityIndexes but values of the PHY-PriorityIndexes are the same, or some of the overlapping resources are not configured with a PHY-PriorityIndex and some are configured with PHY-PriorityIndexes with low values); indication information from the PHY or the network is received (e.g., indicating that only one MAC PDU or resource can be processed, or overlapping resources have been transmitted or cannot be cancelled); the PHY does not support cancellation or PHY cancellation is not configured; a PHY overlapping resource priority processing mode is not configured (e.g., an overlapping resource PHY priority index (PHY-PriorityIndex) is not configured for at least one overlapping resource, indication information that a PHY-PriorityIndex may be carried in DCI is not indicated in an RRC message, or indication information that a PHY-PriorityIndex is not carried or cannot be carried in DCI is indicated in an RRC message).

For example, if a MAC PDU has not been generated yet, a UE MAC only packages one resource; or sends the packaged resource to a PHY (or instructs a PHY to transmit). If a MAC PDU has been generated, no other MAC PDU will be generated even if a resource corresponding to a packaged MAC PDU has a low priority or is not a resource that is transmitted preferentially.

As another example, different overlapping situations are considered for processing. Illustrative examples are as follows.

In a case that a DG overlaps with a CG, a MAC PDU of the DG is generated, or the CG is deprioritized. Accordingly, a DG resource is considered as a prioritized or transmitted resource.

In a case that a PUSCH overlaps with an SR, the SR is not indicated to a PHY for transmission, or the SR is deprioritized. Accordingly, the PUSCH is considered as a prioritized or transmitted resource.

In a case that multiple CGs overlap or multiple DGs overlap, other resources are deprioritized except resources that are transmitted or considered to be prioritized.

In a case that a CG overlaps with a DG, other resources are deprioritized except resources that are transmitted or considered to be prioritized.

3. The PHY only receives one MAC PDU, and the PHY transmits this MAC PDU (or a resource corresponding to the MAC PDU).

Example two: when the second condition is satisfied, a UE MAC generates at least one MAC PDU and/or at least one SR for transmission. Illustratively, a MAC may indicate both an SR (PUCCH) and a MAC PDU (PUSCH) to a PHY for transmission. Illustratively, when the second condition is satisfied, a MAC may indicate both an SR (PUCCH) and a MAC PDU (PUSCH) to a PHY for transmission. PUSCH overlapping is taken as an example for following description. Specifically, taking generating at least one MAC PDU as an example, specific acts are as follows.

1. A network schedules or configures resources of a UE for transmission.

2. If there is overlap between the resources of the UE scheduled or configured by the network, the UE can only send one resource to a network side. However, the UE may package at least one of the resources, or send a packaged resource to a PHY (or instruct a PHY to transmit). When the second condition is satisfied, in a case of resource overlapping, a UE MAC generates at least one MAC PDU, or indicates at least one MAC PDU to the PHY, or indicates at least one transmission to the PHY.

The second condition described above may include at least one of following conditions: the UE has or reports both MAC and PHY priority processing capabilities (R16 priority processing capabilities); UE configures both MAC and PHY overlapping resource priority processing mode; UE configures both a MAC overlapping resource priority processing mode and PHY cancellation; the PHY supports cancellation or PHY cancellation is configured; the UE does not have or does not report a MAC priority processing capability (R16 priority processing capability); a MAC overlapping resource priority processing mode (lch-basedPrioritization) is not configured; values of overlapping resource PHY priority indexes (PHY-PriorityIndexes) configured for at least one resource are different; a PHY overlapping resource priority processing mode configured for at least one resource is configured (e.g., an overlapping resource PHY priority index (PHY-PriorityIndex) is configured, and indication information that a PHY-PriorityIndex may be carried in DCI is configured in an RRC message).

A MAC may package a MAC PDU for each resource, or indicate a packaged MAC PDU of each resource to a PHY (or indicate each transmission to a PHY).

Accordingly, no matter whether a MAC PDU has been generated, the UE MAC packages each resource; or if a MAC PDU has been generated, but a resource corresponding to a packaged MAC PDU has a low priority or is not a resource transmitted preferentially, and the MAC will regenerate a corresponding MAC PDU for a resource with a high priority.

3. The PHY may receive more than one MAC PDU. For overlapping resources, the PHY only receives one MAC PDU, and the PHY transmits the MAC PDU (or a resource corresponding to the MAC PDU); when the PHY receives more than one MAC PDU, the PHY selects one MAC PDU (or a resource corresponding to the MAC PDU) from the more than one MAC PDU for transmission. For example, a PUSCH with a high priority, a starting position of which is in the front or a starting position of which is at the back, is selected depending on implementation of the UE.

In the implementation of the present disclosure, processing by the UE MAC and the PHY is facilitated to be consistent by setting rules and conditions of packaging by the UE MAC.

FIG. 4 is a schematic block diagram of a terminal device 400 according to an implementation of the present disclosure. The terminal device 400 may include: a processing unit 410 configured to transmit an uplink resource according to a satisfied condition in a case of resource overlapping.

Optionally, in the implementation of the present disclosure, the case of resource overlapping includes at least one of following: multiple Physical Uplink Shared Channels (PUSCHs) overlap; a PUSCH overlaps with a Physical Uplink Control Channel (PUCCH); a Dynamic Grant (DG) overlaps with at least one Configured Grant (CG); multiple DGs overlap; and multiple CGs overlap.

Optionally, in the implementation of the present disclosure, the PUCCH is a PUCCH used for transmitting a Scheduling Request (SR).

Optionally, in the implementation of the present disclosure, the uplink resource includes a Medium Access Control (MAC) Protocol Data Unit (PDU) and/or an SR.

Optionally, in the implementation of the present disclosure, the processing unit is further configured to transmit one uplink resource if a first condition is satisfied.

Optionally, in the implementation of the present disclosure, the processing unit is further configured to instruct a MAC to generate one uplink resource, transmit one uplink resource to a Hybrid Automatic Repeat reQuest (HARQ) process, instruct an HARQ process to transmit one uplink resource, and send one uplink resource to a Physical Layer (PHY) or instruct a PHY to transmit one uplink resource.

Optionally, in the implementation of the present disclosure, the processing unit is further configured to, in a case that no uplink resource is generated, instruct a MAC to package one resource to obtain one uplink resource, transmit an uplink resource obtained by package the one resource to an HARQ process, instruct an HARQ process to transmit an uplink resource obtained by packaging the one resource, send an uplink resource obtained by packaging the one resource to a PHY, or instruct a PHY to transmit an uplink resource obtained by packaging the one resource.

Optionally, in the implementation of the present disclosure, the processing unit is further configured to, in a case that an uplink resource has been generated, instruct a MAC not to generate another uplink resource.

Optionally, in the implementation of the present disclosure, the processing unit is further configured to, in a case that an uplink resource has been generated, if packaging is not performed and what is transmitted preferentially is not the generated uplink resource, instruct a MAC to generate another uplink resource.

Optionally, in the implementation of the present disclosure, the first condition includes at least one of following: the terminal device does not have or does not report a PHY priority processing capability; PHY priorities of overlapping resources of the terminal device are the same; the terminal device receives first indication information from a PHY; the terminal device receives first indication information from a network; a PHY of the terminal device does not support cancellation or PHY cancellation is not configured; the terminal device does not configure a PHY overlapping resource priority processing mode; the terminal device does not configure a first parameter; a first parameter is not configured for at least one overlapping resource; values of a first parameter configured for at least one overlapping resource are the same; the terminal device does not support receiving or processing more than one resource; the terminal device does not support receiving or processing more than one resource based on a PHY overlapping resource priority processing mode; the terminal device has or reports a MAC priority processing capability; and the terminal device configures a MAC priority processing mode or a MAC priority processing mode is configured for at least one resource.

Optionally, in the implementation of the present disclosure, the first indication information indicates that the terminal device can only process one uplink resource, overlapping resources have been transmitted, overlapping resources cannot be cancelled, a time requirement for PHY cancellation is not met, a processing requirement for cancellation is not met, the PHY does not support a PHY priority processing capability or a PHY does not configure a PHY priority processing mode.

Optionally, in the implementation of the present disclosure, a case that the terminal device does not configure the PHY overlapping resource priority processing mode includes at least one of following: the terminal device does not configure an overlapping resource PHY priority index for at least one overlapping resource; overlapping resource PHY priority indexes configured by the terminal device for at least one overlapping resource are the same; an RRC message received by the terminal device indicates that an overlapping resource PHY priority index is or cannot carried in DCI; and an RRC message received by the terminal device does not indicate that an overlapping resource PHY priority index may be carried in DCI.

Optionally, in the implementation of the present disclosure, if the first condition is satisfied, a manner in which the processing unit transmits one uplink resource based on the case of resource overlapping includes at least one of following: in a case that a DG overlaps with a CG, a MAC PDU of the DG is generated, or the CG is deprioritized; in a case that a PUSCH overlaps with an SR, the SR is not indicated to the PHY for transmission, or the SR is deprioritized; in a case that multiple CGs overlap or multiple DGs overlap, other resources are deprioritized except resources that are transmitted or considered to be prioritized; and in a case that a CG overlaps with a DG, other resources are deprioritized except resources that are transmitted or considered to be prioritized.

Optionally, in the implementation of the present disclosure, the processing unit is further configured to transmit at least one uplink resource if a second condition is satisfied.

Optionally, in the implementation of the present disclosure, the processing unit is further configured to transmit at least one uplink resource in at least one of following manners: a MAC of the terminal device packages at least one resource to obtain a corresponding uplink resource; a MAC of the terminal device indicates an uplink resource obtained by packaging at least one resource to a PHY; a MAC of the terminal device indicates at least one transmission of an uplink resource to an HARQ process; and a MAC of the terminal device indicates at least one transmission of an uplink resource to a PHY.

Optionally, in the implementation of the present disclosure, the processing unit is further configured to transmit at least one uplink resource in at least one of following manners: in a case that an uplink resource has been generated, if the generated uplink resource has a low priority or is not a resource transmitted preferentially or is not a resource of a predetermined type or is not a predetermined resource, a MAC of the terminal device generates a corresponding uplink resource for a resource with a high priority or a predetermined resource, or a MAC of the terminal device indicates transmission of an uplink resource with a high priority or a predetermined uplink resource.

Optionally, in the implementation of the present disclosure, the processing unit is further configured to, if a PHY only receives one uplink resource, transmit the uplink resource by the PHY.

Optionally, in the implementation of the present disclosure, the processing unit is further configured to, if a PHY receives multiple uplink resources, select one of the uplink resources for transmission by the PHY.

Optionally, in the implementation of the present disclosure, a manner in which the PHY selects the uplink resource includes at least one of following: the PHY selecting a PUSCH, a starting position of which is in the front, for transmission; the PHY selecting a PUSCH that arrives first for transmission; the PHY selecting a PUCCH for transmission; the PHY selecting a PUSCH for transmission; the PHY selecting a PUSCH with a high priority for transmission; the PHY selecting a PUSCH, a starting position of which is at the back, for transmission; the PHY selecting a PUSCH that arrives later for transmission; the PHY selecting a MAC PDU that arrives later for transmission; the PHY selecting a resource, a starting position of which is in the front, for transmission; the PHY selecting a resource that arrives first for transmission; the PHY selecting a resource, a starting position of which is at the back, for transmission; and the PHY selecting a resource that arrives later for transmission.

Optionally, in an implementation of the present disclosure, the second condition includes at least one of following: the terminal device does not have or does not report a MAC priority processing capability; the terminal device does not configure a MAC priority processing mode; the terminal device has or reports both MAC and PHY priority processing capabilities; the terminal device receives second indication information from a PHY; the terminal device receives second indication information from a network; the terminal device configures only a PHY overlapping resource priority processing mode; the terminal device configures a first parameter; a first parameter is configured for at least one overlapping resource; values of a first parameter configured for at least one overlapping resource are different; the terminal device configures both a MAC priority processing mode and a first parameter; the terminal device configures a PHY overlapping resource priority processing mode for at least one uplink resource; the terminal device configures only PHY cancellation; the terminal device configures both MAC and PHY overlapping resource priority processing modes; the terminal device configures both a MAC overlapping resource priority processing mode and PHY cancellation; a PHY of the terminal device supports cancellation or PHY cancellation is configured; the terminal device supports receiving/processing more than one resource; and the terminal device supports receiving or processing more than one resource based on a PHY overlapping resource priority processing mode.

Optionally, in the implementation of the present disclosure, the second indication information indicates that at least one uplink resource can be processed, overlapping resources are not transmitted or overlapping resources may be cancelled, a time requirement for PHY cancellation is met, a processing requirement for cancellation is not met, a PHY supports a PHY priority processing capability, or a PHY configures a PHY priority processing mode.

Optionally, in the implementation of the present disclosure, a case that the terminal device configures the PHY overlapping resource priority processing mode includes at least one of following: the terminal device configures an overlapping resource PHY priority index; overlapping resource PHY priority indexes configured by the terminal device are different; and an RRC message received by the terminal device indicates that an overlapping resource PHY priority index (PHY-PriorityIndex) is or may be carried in Downlink Control Information (DCI).

Optionally, in the implementation of the present disclosure, in a case of resource overlapping, a resource, which is considered to have a low priority or is not transmitted, is configured to be deprioritized.

Optionally, in the implementation of the present disclosure, the SR includes an SR transmission, which is an available SR transmission resource. The SR transmission does not include an SR resource of a deprioritized SR.

Figure 5:
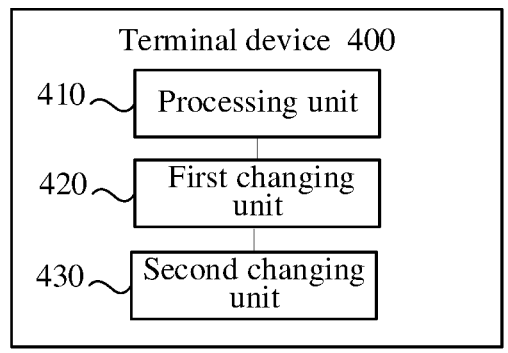
FIG. 5 is a schematic block diagram of a terminal device according to another implementation of the present disclosure.

Optionally, in the implementation of the present disclosure, as shown in FIG. 5, the terminal device further includes: a first changing unit 420 configured to, if a priority of a first uplink resource changes to be higher or a priority of a first uplink resource changes to be higher than a priority of another uplink resource which overlaps with the first uplink resource, perform a MAC priority processing mode for the first uplink resource, wherein a priority of the first uplink resource can be compared with a priority of the another uplink resource, or the first uplink resource can be re-considered to be deprioritized or prioritized, or a determination whether the first uplink resource is deprioritized or prioritized can be re-executed.

Optionally, in the implementation of the present disclosure, the terminal device further includes: a second changing unit 430 configured to, if a second uplink resource is considered to be deprioritized because it overlaps with another uplink resource, and the other uplink resource is considered or re-considered to be deprioritized, perform a MAC priority processing mode for the second uplink resource, wherein a priority of the second uplink resource can be compared with a priority of the another uplink resource, or the second uplink resource can be re-considered to be deprioritized or prioritized, or a determination whether the second uplink resource is deprioritized or prioritized can be re-executed.

Optionally, in the implementation of the present disclosure, the first uplink resource or the second uplink resource is considered or can be considered to be a resource with a high priority.

The terminal device 400 in the implementation of the present disclosure can implement corresponding functions of the terminal device in the above-mentioned method implementations. Corresponding processes, functions, implementations, and beneficial effects of various modules (sub-modules, units, or components) in the terminal device 400 may be described with reference with corresponding descriptions in the above-mentioned method implementations, and will not be repeated herein.

It should be noted that the described functions of various modules (sub-modules, units, or components) in the terminal device 400 in the implementation of the present disclosure may be implemented by different modules (sub-modules, units, or components) or by a same module (sub-module, unit, or component).

Figure 6:
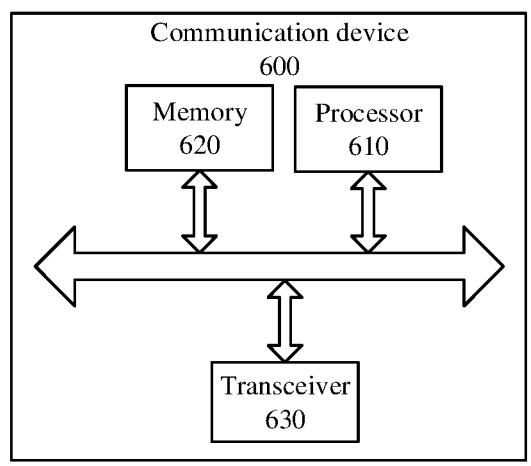
FIG. 6 is a schematic block diagram of a communication device according to an implementation of the present disclosure.

FIG. 6 is a schematic block diagram of a communication device 600 according to an implementation of the present disclosure. The communication device 600 includes a processor 610, which may invoke and run a computer program from a memory to implement the methods according to the implementations of the present disclosure. For example, the processing unit 410 may be implemented by one or more processors.

Optionally, as shown in FIG. 6, the communication device 600 may further include a memory 620. The processor 610 may invoke and run a computer program from the memory 620 to implement the methods according to the implementations of the present disclosure.

The memory 620 may be a separate device independent of the processor 610 or may be integrated in the processor 610.

Optionally, as shown in FIG. 6, the communication device 600 may further include a transceiver 630. The processor 610 may control the transceiver 630 to communicate with other devices. Specifically, the transceiver 730 may send information or data to other devices or receive information or data sent by other devices.

The transceiver 630 may include a transmitter and a receiver. The transceiver 630 may further include antennas, a quantity of which may be one or more.

Optionally, the communication device 600 may be the network device in the implementations of the present disclosure, and the communication device 600 may implement corresponding processes implemented by the network device in various methods according to the implementations of the present disclosure, which will not be repeated herein.

Optionally, the communication device 600 may be the terminal device in the implementations of the present disclosure, and the communication device 600 may implement corresponding processes implemented by the terminal device in various methods according to the implementations of the present disclosure, which will not be repeated herein.

Figure 7:
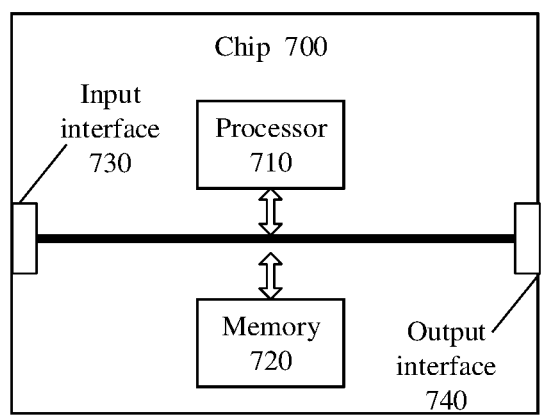
FIG. 7 is a schematic block diagram of a chip according to an implementation of the present disclosure.

FIG. 7 is a schematic block diagram of a chip 700 according to an implementation of the present disclosure. The chip 700 includes a processor 710, which may invoke and run a computer program from a memory to implement the methods according to the implementations of the present disclosure.

Optionally, as shown in FIG. 7, the chip 700 may further include a memory 720. The processor 710 may invoke and run a computer program from the memory 720 to implement the methods performed by the terminal device or the network device in the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 410 may acquire information or data sent by other devices or chips.

Optionally, the chip 700 may further include an output interface 740. The processor 710 may control the output interface 740 to communicate with other devices or chips. Specifically, the processor 410 may output information or data to other devices or chips.

Optionally, the chip may be applied to the network device in the implementations of the present disclosure, and the chip may implement corresponding processes implemented by the network device in various methods according to the implementations of the present disclosure, which will not be repeated herein.

Optionally, the chip may be applied to the terminal device in the implementations of the present disclosure, and the chip may implement corresponding processes implemented by the terminal device in various methods according to the implementations of the present disclosure, which will not be repeated herein.

Chips applied to the network device and the terminal device may be a same chip or different chips.

It should be understood that the chip mentioned in the implementations of the present disclosure may also be referred to as a system-level chip, a system chip, a chip system, or a system-on-chip, etc.

The above-mentioned processor may be a general purpose processor, a Digital Signal Processor (DSP), a Field Programmable Gate Array (FPGA), an Application Specific Integrated Circuit (ASIC) or another programmable logic device, a transistor logic device, a discrete hardware component, etc. The general purpose processor mentioned above may be a microprocessor or any conventional processor.

The above-mentioned memory may be a volatile memory or a non-volatile memory, or may include both volatile and non-volatile memories. The non-volatile memory may be a Read-Only Memory (ROM), a Programmable ROM (PROM), an Erasable PROM (EPROM), an Electrically Erasable EPROM (EEPROM), or a flash memory. The volatile memory may be a Random Access Memory (RAM).

It should be understood that the foregoing memories are exemplary but not restrictive description. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is to say, the memory in the implementations of the present disclosure is intended to include, but is not limited to, these and any other suitable types of memories.

Figure 8:
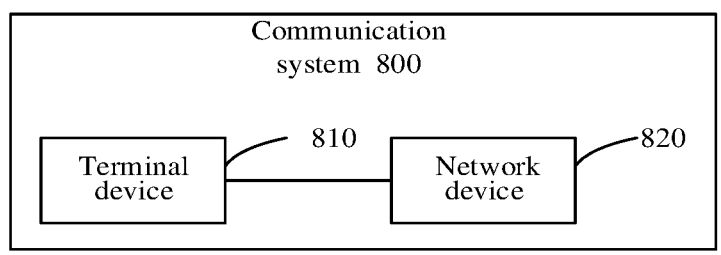
FIG. 8 is a schematic block diagram of a communication system according to an implementation of the present disclosure.

FIG. 8 is a schematic block diagram of a communication system 800 according to an implementation of the present disclosure. The communication system 800 includes a terminal device 810 and a network device 820.

The terminal device 810 is configured to transmit an uplink resource according to a satisfied condition in a case of resource overlapping. The satisfied condition may be known with reference with related descriptions of the first condition and the second condition mentioned above.

Optionally, the network device 820 may send a related configuration to the terminal device 810.

The terminal device 810 may be configured to implement corresponding functions implemented by the terminal device in the methods described above, and the network device 820 may be configured to implement corresponding functions implemented by the network device in the methods described above, which will not be repeated herein for brevity.

The functions in the implementations described above may be implemented in whole or in part through software, hardware, firmware, or any combination thereof. When implemented through software, the functions may be implemented in whole or in part in a form of a computer program product. The computer program product includes one or more computer instructions. When the computer program instructions are loaded and executed on a computer, processes or functions are generated in whole or in part according to the implementations of the present disclosure. The computer may be a general purpose computer, a special purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website site, a computer, a server, or a data center to another website site, computer, server, or data center through a wired mode (e.g., a coaxial cable, an optical fiber, and a Digital Subscriber Line (DSL)) or a wireless mode (e.g., infrared radiation, radio, and microwave.). The computer-readable storage medium may be any available medium which a computer may access to, or a data storage device such as a server or data center that includes one or more available media integrated therein. The available medium may be a magnetic medium (e.g., a floppy disk, a hard disk, and a magnetic tape), an optical medium (e.g., a Digital Video Disc (DVD)), or a semiconductor medium (e.g., a Solid State Disk (SSD)), or the like.

It should be understood that sizes of serial numbers of the foregoing processes do not mean execution sequences in various implementations of the present disclosure. The execution sequences of the processes should be determined according to functions and internal logics of the processes, and should not impose any limitation on implementation processes of the implementations of the present disclosure.

Those skilled in the art may clearly understand that for the sake of convenience and conciseness of description, specific working processes of the systems, apparatuses, and units described above may be known with reference with corresponding processes in the aforementioned method implementations, and will not be repeated herein.

What are described above are merely specific implementations of the present disclosure, but the protection scope of the present disclosure is not limited thereto. Any variation or substitution that may easily occur to a person skilled in the art within the technical scope disclosed in the present disclosure shall be included within the protection scope of the implementations of the present disclosure. Therefore, the protection scope of the present disclosure shall be subject to the protection scope of the claims.

The invention claimed is:

1. A resource transmission method, comprising:
in response to determining a plurality of Configured Grants (CGs) overlapping, indicating, by a Medium Access Control (MAC) of a terminal device, at least two transmissions of an uplink resource to a Hybrid Automatic Repeat reQuest (HARQ) process when the terminal device does not configure a MAC priority processing mode; wherein indicating, by the MAC of the terminal device, the at least two transmissions of the uplink resource to the HARQ process comprises:
for the uplink resource, indicating, by the MAC of the terminal device, transmission of the uplink resource to the HARQ process; or
for a part of the uplink resource, indicating, by the MAC of the terminal device, transmission of the part of the uplink resource to the HARQ process;
wherein the at least two transmissions of the uplink resource comprises at least one of: transmissions of multiple MAC Protocol Data Units (PDUs); transmissions of multiple scheduling requests (SRs) transmitted; transmissions of one MAC PDU and one SR; transmissions of one MAC PDU and multiple SRs; or transmissions of multiple MAC PDUs and one SR.

2. The method of claim 1, wherein the terminal device does not configure a MAC priority processing mode, comprising:
the terminal device does not configure Logical Channel (LCH)-based prioritization (lch-basedPrioritization).

3. A terminal device comprising: a processor and a transceiver, wherein
in response to determining a plurality of Configured Grants (CGs) overlapping, the transceiver is configured to indicate at least two transmissions of an uplink resource to a Hybrid Automatic Repeat reQuest (HARQ) process, by a Medium Access Control (MAC) of a terminal device, when the terminal device does not configure a MAC priority processing mode; wherein the transceiver is further configured to:
for the uplink resource, indicate transmission of the uplink resource to the HARQ process; or
for a part of the uplink resource, indicate transmission of the part of the uplink resource to the HARQprocess;
wherein the at least two transmissions of the uplink resource comprises at least one of: transmissions of multiple MAC Protocol Data Units (PDUs); transmissions of multiple scheduling requests (SRs) transmitted; transmissions of one MAC PDU and one SR; transmissions of one MAC PDU and multiple SRs; or transmissions of multiple MAC PDUs and one SR.

4. The terminal device of claim 3, wherein the terminal device does not configure a MAC priority processing mode, comprising:
the terminal device does not configure Logical Channel (LCH)-based prioritization (lch-basedPrioritization).

5. A computer-readable storage medium for storing a computer program, wherein when the computer program is run by a device, the device is enabled to perform the method of claim 1.

* * * * *